(12) United States Patent
Blücher et al.

(10) Patent No.: US 11,118,679 B2
(45) Date of Patent: Sep. 14, 2021

(54) ACTUATOR, DEVICE FOR ENGAGING A PARKING LOCK OF A MOTOR-VEHICLE AUTOMATIC TRANSMISSION HAVING SUCH AN ACTUATOR AND MOTOR VEHICLE EQUIPPED THEREWITH

(71) Applicant: Küster Holding GmbH, Ehringshausen (DE)

(72) Inventors: Martin Blücher, Ehringshausen (DE); Thomas Schmidt, Ehringshausen (DE); Heiko Schirmer, Regesbostel (DE); Bernd Junker, Sinn-Edingen (DE)

(73) Assignee: Küster Holding GmbH, Ehringshausen (DE)

( * ) Notice: Subject to any disclaimer, the term of this patent is extended or adjusted under 35 U.S.C. 154(b) by 449 days.

(21) Appl. No.: 16/093,674

(22) PCT Filed: Apr. 20, 2017

(86) PCT No.: PCT/EP2017/059362
§ 371 (c)(1),
(2) Date: Oct. 15, 2018

(87) PCT Pub. No.: WO2017/182555
PCT Pub. Date: Oct. 26, 2017

(65) Prior Publication Data
US 2020/0032898 A1 Jan. 30, 2020

(30) Foreign Application Priority Data
Apr. 21, 2016 (DE) .......................... 102016107449.7

(51) Int. Cl.
 F16H 63/34 (2006.01)
 F16H 61/28 (2006.01)
(Continued)

(52) U.S. Cl.
 CPC ............. *F16H 61/28* (2013.01); *F16H 25/18* (2013.01); *F16H 63/304* (2013.01);
(Continued)

(58) Field of Classification Search
 CPC .. F16H 63/34; F16H 63/3416; F16H 63/3491; F16H 63/304; F16H 63/3466;
(Continued)

(56) References Cited

U.S. PATENT DOCUMENTS

| 4,531,423 A | 7/1985 | Fogelberg |
| 5,916,326 A | 6/1999 | Tischer |

(Continued)

FOREIGN PATENT DOCUMENTS

| CN | 204805506 U | 11/2015 |
| DE | 19610491 A1 | 9/1997 |

(Continued)

*Primary Examiner* — Charles A Fox
*Assistant Examiner* — Ryan P Dodd
(74) *Attorney, Agent, or Firm* — Rogowski Law LLC

(57) ABSTRACT

The invention relates to an actuator, comprising a drive (2) that drives a drive shaft (1), a first actuating element (3) operatively connected to the drive shaft (1) for actuating a switching apparatus, a spring element (5), which can be supported at one end on a housing component (16) of the actuator and is supported on the other end on a second actuating element (17) designed to load the spring element (5). The actuator according to the invention is characterized in that a rotatably mounted rotational element/gearwheel (13) that can be driven by means of the drive shaft (1) is provided, which rotational element has, on one side, a first control gate (7), which is operatively connected to the first actuating element (3) for actuation of the switching apparatus, and on the other side, a second control gate (8) for loading the spring element (5).

15 Claims, 11 Drawing Sheets

(51) Int. Cl.
*F16H 25/18* (2006.01)
*F16H 63/30* (2006.01)

(52) U.S. Cl.
CPC ..... *F16H 63/3466* (2013.01); *F16H 63/3491* (2013.01); *F16H 2061/2869* (2013.01); *F16H 2061/2892* (2013.01); *F16H 2063/3056* (2013.01); *F16H 2063/3066* (2013.01)

(58) Field of Classification Search
CPC ..... F16H 2063/3066; F16H 2063/3056; F16H 2063/2892
See application file for complete search history.

(56) References Cited

U.S. PATENT DOCUMENTS

| | | | |
|---|---|---|---|
| 6,481,556 B1 * | 11/2002 | Haupt | F16H 63/3491 192/219.5 |
| 10,234,028 B2 * | 3/2019 | Jeon | F16H 61/32 |
| 2013/0263684 A1 | 10/2013 | McCloy | |
| 2013/0305865 A1 | 11/2013 | Howe | |
| 2017/0307080 A1 * | 10/2017 | Bormann | B60T 1/005 |

FOREIGN PATENT DOCUMENTS

| | | | |
|---|---|---|---|
| DE | 10045953 A1 | 5/2002 | |
| DE | 102011014815 A1 | 10/2011 | |

* cited by examiner

ACTUATOR, DEVICE FOR ENGAGING A PARKING LOCK OF A MOTOR-VEHICLE AUTOMATIC TRANSMISSION HAVING SUCH AN ACTUATOR AND MOTOR VEHICLE EQUIPPED THEREWITH

CROSS-REFERENCE TO RELATED APPLICATIONS

This application is a national stage application (under 35 USC § 371) of PCT/EP2017/059362, filed Apr. 20, 2017, which claims benefit of German application No. 10 2016 107 449.7, filed Apr. 21, 2016, the contents of each of which are incorporated by reference herein.

BACKGROUND OF THE INVENTION

Technical Field and State of the Art

The invention relates to a device for activating a parking lock of a motor vehicle automatic gearbox/transmission as well as a motor vehicle equipped therewith.

The use of automatic shifting actuations and shift-by-wire systems in motor vehicles offers a few advantages compared to mechanically coupled shifting actuations. For example, the shifting stages of the gearbox can be flexibly selected using software depending upon the state of the vehicle. The activation of the parking lock by the setting of the P-stage is also no longer performed by the driver here, but is rather ensured automatically by the control software, for example when stopping or when exiting the vehicle. Because a setting of the P-stage in order to activate the parking lock before exiting the motor vehicle is mandatory for safety reasons, such systems and actuators have emergency mechanisms that are meant to ensure a setting of the P-stage even in the event of disruptions of the actuator or loss of power. These emergency mechanisms typically work with energy loaders such as mechanical spring elements, which ensure, for example, the setting of a mechanical emergency position independently of the actuator.

DE 10 2011 014 815 A1 describes a motor vehicle parking lock actuator with at least one spindle, wherein a longitudinal motion for automatic shifting to a transmission stage is realized through a rotatory movement of an engine. The emergency function for setting of the parking lock is realized through a spring element, which is preloaded through the activation of the non-parking setting of the actuator and mechanically held by a catch mechanism. A shifting function for the triggering of the emergency mechanism for the setting of the P-stage should be performed by a power source that is independent of the actuator. However, the disadvantage of this actuator is that in order to trigger the emergency mechanism, an independent power source is required. Thus, the P-stage cannot be set if the independent power source is also not available, which may occur in particular if the accumulator/battery of the motor vehicle is drained and there is no other power source available, such as a properly functioning generator.

Further, with the actuator in DE 10 2011 014 815 A1, the P-stage must be exited in order to preload the spring element, whereby an undesired and unsafe vehicle situation arises, because the P-stage of the gearbox is exited although the emergency mechanism is not yet available.

DE 100 45 953 B4 discloses a parking lock device that is provided for a motor vehicle equipped with an automatically controllable gearbox, in particular. The parking lock has an actuation device comprising an actuation element for actuating a parking lock, a spring loader for activating the parking lock, a controllable actuator drive for deactivating the parking lock, and a locking device for fixing the parking lock in the deactivated state. The actuator drive is designed to be electromechanically effective and is connected to a main actuation switch. The spring loader, the actuator drive, and the locking device can be connected or operatively connected to the actuation element via the main actuation switch.

One object of the invention is therefore to further develop an actuator such that it is ensured that in all situations, in particular in the event of a failure of the power supply, an actuation element for actuating a shifting device of the actuator is automatically guided back into its starting position. It is a further object of the invention to provide a device for the setting of a parking lock of a motor vehicle automatic gearbox with such an actuator as well as an improved motor vehicle.

SUMMARY OF THE INVENTION

The inventive actuator has a drive driving a drive shaft, a first actuating element operatively connected to the drive shaft for the purpose of actuating a shifting device, and a spring element, wherein the spring element is, on the one hand, supportable on a housing component of the actuator and, on the other hand, supports itself on a second actuating element designed in order to load the spring element. The invention now distinguishes itself in that a rotary element is provided that can be driven using the drive shaft and is mounted in a rotatable fashion, which is designed, on the one hand, with a first control cam that is operatively connected to the first actuating element and, on the other hand, with a second control cam for the loading of the spring element. The function of the spring element here is to set the P-stage in the event of a disruption of the actuator or a loss of power. For this purpose, the spring element can also be operatively connected to the first actuating element via the second operating element, such that due to the resetting force created by the preloading of the spring element, the first actuating element can be guided back into the P-stage along the first control cam. In particular, the second actuating element can be designed as a carrier for the first actuating element.

For the purposes of exiting the P-stage and setting the various shifting stages, for example R, N, D, the rotary element can be twisted via the drive and the drive shaft such that the first control cam can move the first actuating element due to the operative contact with the first control cam. A shifting device connecting the actuator and the automatic gearbox, for example with a shifting cable, is designed in order to transfer the movement produced on the actuator to the automatic gearbox, such that the P-stage can be exited and the various shifting stages, for example R, N, D, can be set.

For this purpose, the first control cam can have various inclines for the shifting movement and for the setting of the shifting stages. The incline of the control cam can be designed, for example, such that sufficient setting force for exiting the parking lock can be produced under all conditions via the actuator or an emergency adjustment device. The setting force is essentially composed of the minimum adjustment force necessary in the gearbox for the setting of various shifting stages and, if applicable, the resetting force of the spring element, against which the actuator is already working upon exiting the P-stage. For example, such a setting force can be approximately 500N. In the event of an emergency operation, the rotary element and the engine are conversely rotated back through the incline of the first control cam by interaction with the first and second actuating elements of the actuator under the influence of the spring force created by the spring element.

In order to strike or engage in the first control cam, a first engagement element of the actuating element is provided for the actuating of a shifting device, and in order to strike or engage in the second control cam, a second engagement element of the second actuating element is provided.

The inventive device for the setting of a parking lock in an automatic gearbox of a motor vehicle has such an inventive actuator.

Through the use of an inventive actuator in a device for the setting of a parking lock in an automatic gearbox of a motor vehicle, it is now ensured that the spring element can always be preloaded before the P-stage of the automatic gearbox of the motor vehicle is exited. Using the second control cam and the second engagement element of the second actuating element, it is now possible, namely, for the spring element to be preloaded without changing the position of the first actuating element. This enables the spring element to be preloaded while the first actuating element is in such a position that the automatic gearbox of the motor vehicle is set in the P-stage when using such an actuator in a motor vehicle with an automatic gearbox.

The rotary element can be limited in the range of its rotary movement between a maximum negative and a maximum positive rotary position due to the design of the first and/or the second control cam such that, for example, a half rotation in each rotational direction, i.e. approximately +180° or −180°, is possible. In an especially advantageous embodiment of the invention, this is achieved in that the rotary element with the two control cams is designed such that it can be twisted via the drive shaft or the drive between a maximum negative angular position up to −180° and a maximum positive angular position up to +180°, wherein the spring element is loaded through a rotation from 0° up to the maximum negative angular position, i.e. up to −180°, via the second control cam and the second engagement element of the second actuating element, while the first control cam is designed such that with such a rotation of the rotary element, the position of the first actuating element remains unchanged. It is hereby ensured in a simple fashion that the P-stage of the automatic gearbox remains set while the spring element is preloaded under buildup of a resetting force. Other angular areas given by the maximum angular positions, in particular smaller angular areas, are also conceivable within the meaning of the invention. The present invention can thus also be realized with rotational ranges given, based upon the design of the control surfaces, at 0° up to approximately 170° and/or 0° up to approximately −170°.

According to a further advantageous embodiment of the invention, it is provided that with a rotation of the rotary element of 0° in the direction of the maximum positive angular position, for example up to 180°, using the first control cam and the first engagement element of the first actuating element, various shifting stages of such a shifting device can be set. The enables various shifting stages of an automatic gearbox to be set without needing to simultaneously load the spring element, because this preloading of the spring element has already been performed by the twisting of the rotary element into its maximum negative rotational position described above, for example between 0° and −180°. In order for this preloading to remain intact during the converse rotation up to 0° from its maximum angular position, for example −180°, a retention device is advantageously provided, in particular an electric retention magnet device, with which the spring element loaded under buildup of a resetting force is held in its position. A loading of the spring element during the setting of various shifting stages out of the P-stage is thus not necessary, because this has already been performed.

In order to provide an especially constructive design of the rotary element, it has been established that the rotary element is designed as a disk, upon which the two control cams are arranged on the opposing surfaces of the disk, respectively. To this extent, the control cams can be arranged via the corresponding engagement element without difficulty, and disruptive influences of the other control cams or the corresponding engagement element do not need to be taken into account.

In the event that the spring element is not preloaded upon removal from the P-stage, then the first control cam is designed such that upon twisting the rotary element from its angular position 0° up to its maximum positive angular position up to +180°, the spring element is loaded under buildup of a resetting force. The preloading of the spring element occurs, in particular, directly after exiting the P-stage, such that the resetting force of the spring element that is immediately made available is sufficient in order to guide the first actuating element back into the P-stage.

In this operating case, it can be provided that the first actuating element acts as a carrier for the second actuating element, such that the spring element is guided into its clamping position by the second actuating element carried under the effect of the first actuating element under the buildup of the resetting force.

According to a further advantageous conception of the invention, a projection for the placement of the second engagement element is arranged on the surface of the rotary element to which the second control cam is applied for the loading of the spring element. This projection is arranged such that the second engagement element can be dropped or placed on this projection if the first actuating element is in its starting position, which corresponds to the P-stage of an automatic gearbox and a twisting of the rotary element by 0°. This enables the spring to remain preloaded if a motor vehicle equipped with such an actuator has been properly turned off, and thus the entire actuator and the entire vehicle are load-free, because the corresponding power circuits are interrupted.

It has further proven to be advantageous for a screw to be arranged on the drive shaft, through which a gearwheel arrangement can be driven, which in turns drives the rotary element. Here, the rotary element can itself be a part of this gearwheel arrangement, wherein it is also possible for the gearwheel arrangement to consist of only one gearwheel.

Alternatively, of course, it is also conceivable for the gearwheel arrangement to consist of multiple gearwheels that are operatively connected to each other, wherein one gearwheel is designed as a disk that has the corresponding control cams on its opposing surfaces.

According to a further advantageous conception of the invention, a damping element is provided, which damps the movement of the rotary element and/or the actuating element for the actuation of a shifting device and/or the actuating element for the preloading of the spring element if the rotary element is twisted under the influence of the resetting force of the spring element. This ensures that no or hardly any disruptive noises occur during the twisting of the rotary element under the influence of the resetting force of the spring element, because the noise development is suppressed, weakened, or damped through such a damping element.

In a further development of this object, it can also be provided that the damping element is simultaneously designed as a carrier device. Here, upon triggering of the emergency mechanism, the movement of the second actuating element caused by the spring element can be transferred to the first actuating element. The movement caused by the first actuating element during the loading of the spring element without use of the second control cam can be transferred to the second actuating element upon which the spring element is supported, in turn. Here, it can preferably be provided that a pin formed on the first actuating element is mounted in a boring of the second actuating element in a slidable fashion. In order to implement a damping property, the movement of the pin within the boring can be mechanically or fluidly dynamically damped, for example through the encasing or elimination of a quantity of gas located in the boring. In order to implement a carrier function, it can be provided in turn that the pin and the base of the boring can be brought into contact with one another within the second actuating element, such that forces can be transferred if the pin of the first actuating element lies upon the base of the boring of the second actuating element. The base of the boring can thus form a mechanical stop for the pin.

A device for the setting of a parking lock of a motor vehicle automatic gearbox with a previously described actuator should also be separately protected.

Additionally, a motor vehicle using such a device should be separately protected, wherein the motor vehicle has an automatic gearbox and a previously described device for the setting of a parking lock of the automatic gearbox.

According to an advantageous conception of the invention, such a device and a motor vehicle with such a device have a mechanical, electromechanical, electric, electronic, hydraulic, or pneumatic emergency adjustment device, with which the actuating element for the actuating of a shifting device can be driven and/or the spring element can be loaded, if the drive is no longer drivable.

DESCRIPTION OF THE DRAWINGS

Further goals, advantages, features and applications of the present invention are derived from the subsequent description of embodiments by way of the drawings. All described and/or depicted features per se or in any combination constitute the subject matter of the present invention, regardless of their summary in the patent claims or their back-reference.

The following are shown.

DETAILED DESCRIPTION

Figure 1:
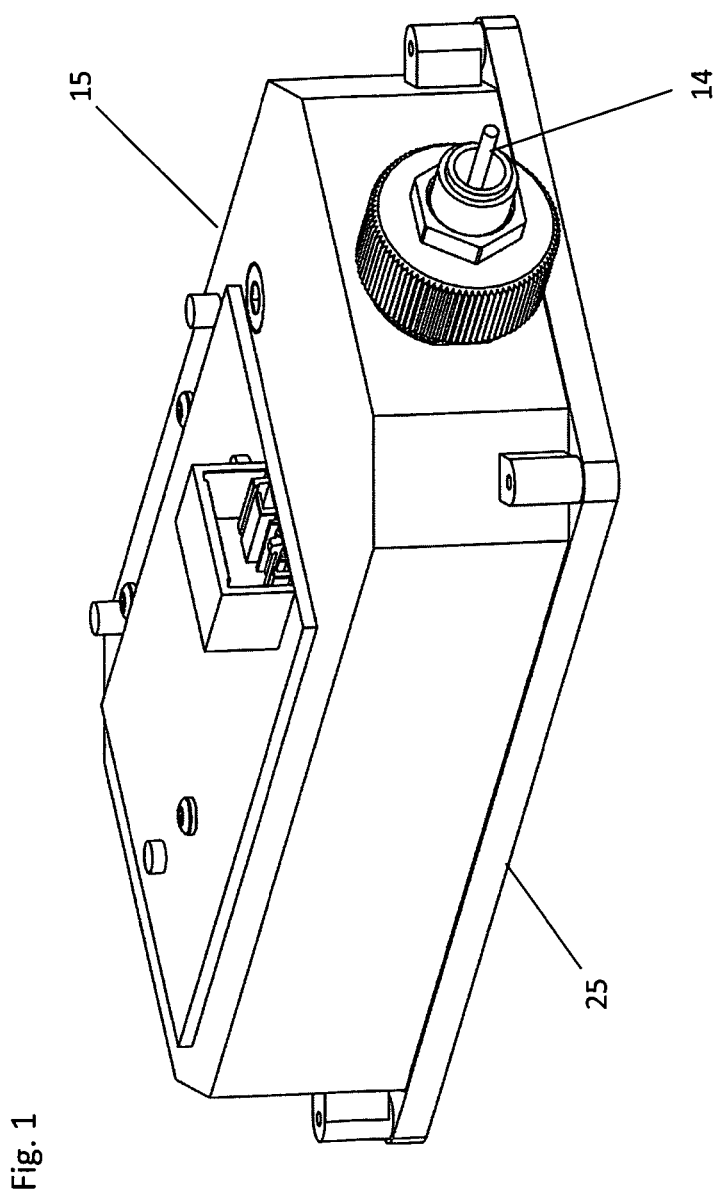
FIG. 1: an embodiment of an inventive actuator arranged in a housing.

FIG. 1 shows an exemplary embodiment of an inventive actuator arranged in a housing comprising a housing lid 15 and a housing plate 25, wherein details of the inventive actuator are not visible in this illustration due to the housing. The actuator is arranged on the housing plate 25 and covered with the housing lid 15. This illustration also shows a cable 14, with which various shifting stages of an automatic gearbox of motor vehicle can be set. The cable 14 is operatively connected to a first actuating element 3, not shown here, for the actuation of the shifting device of the motor vehicle automatic gearbox of the motor vehicle.

Figure 2:
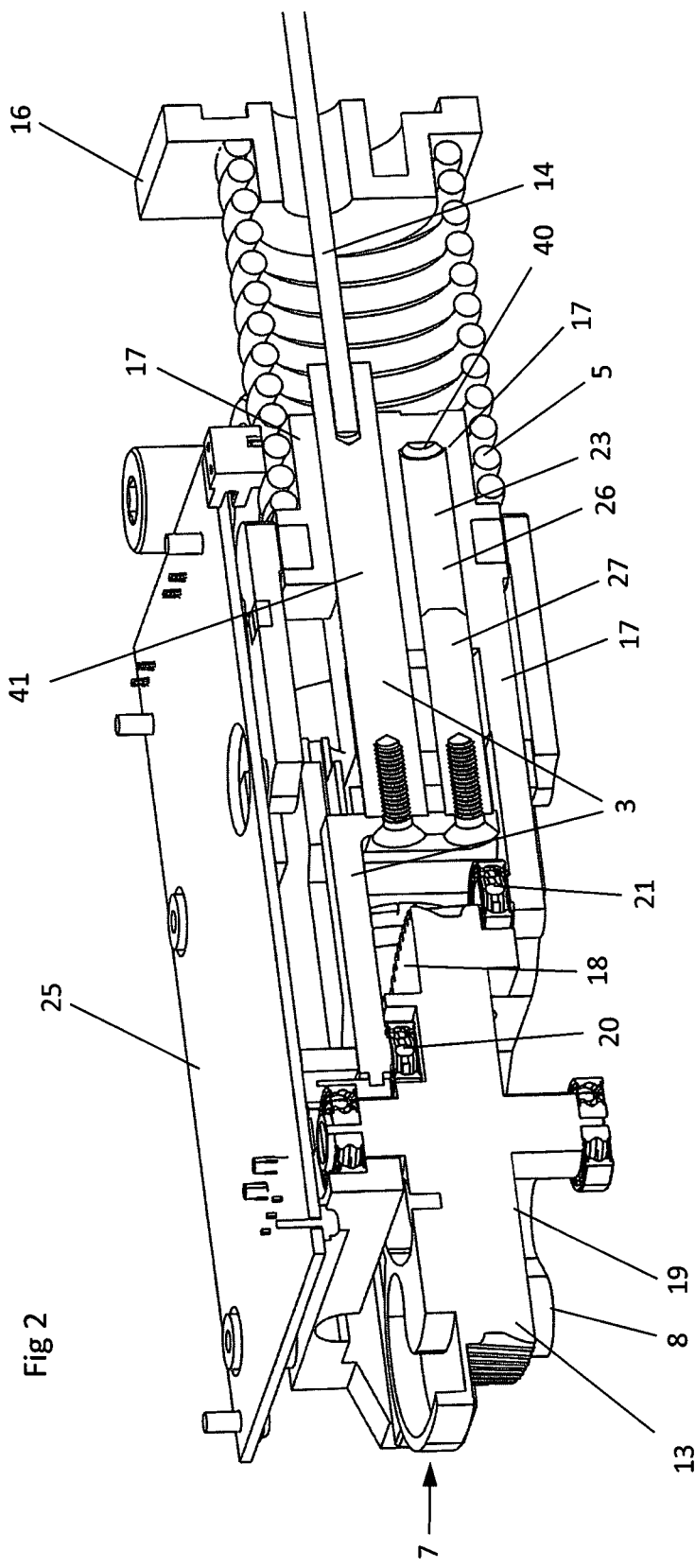
FIG. 2: an embodiment of an inventive actuator in a sectional view.

FIG. 2 now shows the exemplary embodiment of the inventive actuator in a sectional view along its middle longitudinal axis. The rotary element designed as a gearwheel 13 is clearly seen and is also designed as a disk. The rotary element is rotatably mounted in its center and has two different control cams 7 and 8 on its opposing surfaces 18 and 19. In the present case, the gearwheel 13, which can also be part of a gearwheel arrangement, meshes with a screw 11 of a drive shaft 1 of a drive 2 hidden in FIG. 2.

Further, FIG. 2 shows the first actuating element 3, which is equipped on the one hand with a first engagement element 20, which engages for the purposes of engagement in the control cam 7, and is connected on the other hand to the cable 14 of a shifting device of the automatic gearbox of the motor vehicle.

The first actuating element 3 is mounted in a slidable fashion in a second actuating element 17, which is equipped on the one hand with a second engagement element 21 for the purposes of engagement in the second control cam 8, and supports itself on a spring element 5 on the other hand. Further, a boring 26 is arranged within this second actuating element 17 for the loading of the spring element 5, and a pin 27 of the first actuating element 3 is slidably mounted in this boring 26. The pin 27 is inserted into the boring 26 on the side of the second actuating element 17 facing the rotary element or gearwheel 13 and is slidable within it. The actuating element slides simultaneously in a parallel boring 41 of the second actuating element 17, via which the first actuating element 3 is connected to the cable 14. The pin 27 and the boring 26 interact such that the pin can sit upright on the base of the boring 26 with its end that faces away from the rotary element/gearwheel 13. In this case, forces can be transferred from the first actuating element 3 to the second actuating element 17 or from the second actuating element 17 to the first actuating element 3. As long as the spring element 5 lingers in the clamping position shown in FIG. 2 via the second actuating element 17, the first actuating element 3 can be adjusted with respect to the second actuating element 17 in the direction of the boring 26 or in the direction of the parallel boring and in the direction of the cable 14, in order to set various shifting stages of the automatic gearbox. As soon as the pin 27 sits upright on the base of the boring 26 with its end that faces away from the rotary element/gearwheel 13, the first actuating element 3 and the second actuating element 17 act as carriers for one another, depending upon the direction of the force action that is transferred via the base of the boring 26 and the pin 27 sitting thereupon.

The boring 26 in the second actuating element 17 is filled with gas or air, such that when sliding the pin 27 within the boring 26, a damping element 23 is formed by the boring 26, which dampens the movement of the pin 27 in the boring 26 in the sense of a noise minimization. For this purpose, the boring 26 is equipped with a membrane element or an opening, not shown here, through which the air or gas can escape.

This illustration further shows the housing plate 25 upon which the actuator is arranged. FIG. 2 further shows that the spring element 5 supports itself on a housing component 16 of the actuator, on the one hand, and on the actuating element 17, on the other hand.

Figure 3:
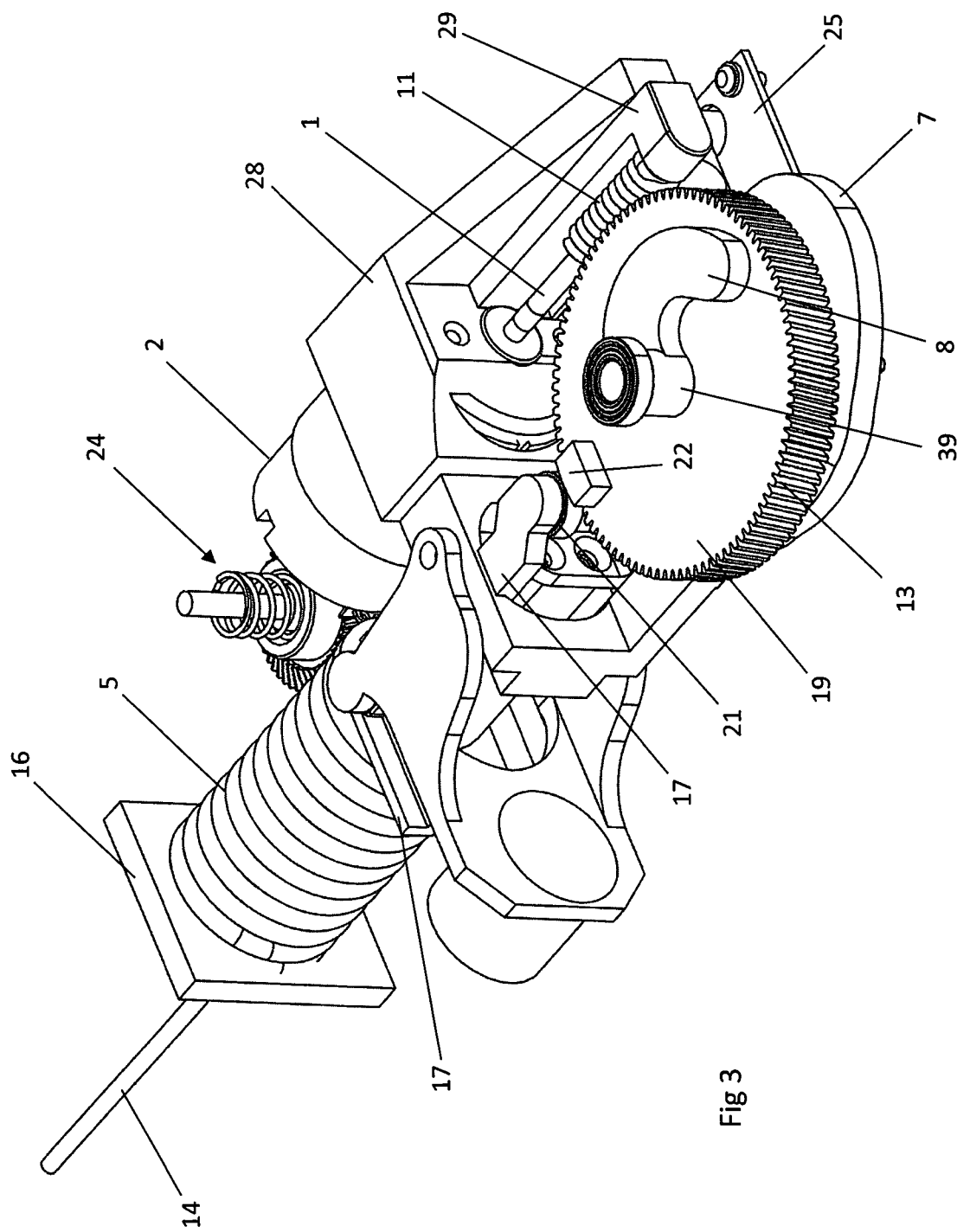
FIG. 3: the actuator according to FIG. 2 in a perspective view from above.

FIG. 3 shows the actuator now in a perspective view from above. What is especially clear here is the rotary element/gearwheel 13 that is designed as a disk and gearwheel 13 and is mounted rotatably. In this view, the drive 2 with its drive shaft 1 can now be seen, wherein a screw 11 is arranged on the drive shaft 1 and meshes with the gearwheel 13. Further, an additional housing component 28 can be seen here, which is arranged on the housing plate 25 and has a free end 29 in which the drive shaft 1 of the drive 2 is rotatably mounted and held in place.

On the surface 19 of the rotary element/gearwheel 13, the second control cam 8 is arranged, which, upon twisting of the rotary element/gearwheel 13 in the direction of its maximum negative rotational position, i.e. counter-clockwise—in this illustration—can be engaged with the second engagement element 21 of the second actuating element 17 for the loading of the spring element 5. There is also the convexly designed section of the control cam in place with the engagement element 21, which, in the case of an unloaded spring element 5, would also be slid in the direction of the hub 39 of the rotary element/gearwheel 13, by contrast to the illustration in FIG. 3.

Further, a projection 22 is arranged on the surface 19, upon which the second engagement element 21 lies in the case of a loaded spring element. In the operation of a motor vehicle, the spring element 5 is held in the preloaded position with the assistance of an electric retention magnet device 32 after having been preloaded. In the illustration in FIG. 3, the actuation element 3, which is hidden here, is held in the P-stage of the automatic gearbox, which corresponds to a neutral angular position of 0° of the rotary element. Provided that the actuator is now load-free, the preloading of the spring element 5 is nevertheless maintained due to the placement of the engagement element 21 upon the projection 22, although the retention magnet device 32 no longer exercises any retention force. In the illustration in FIG. 3, an emergency adjustment device 24 is also visible, which will be explained in further detail below.

Figure 4:
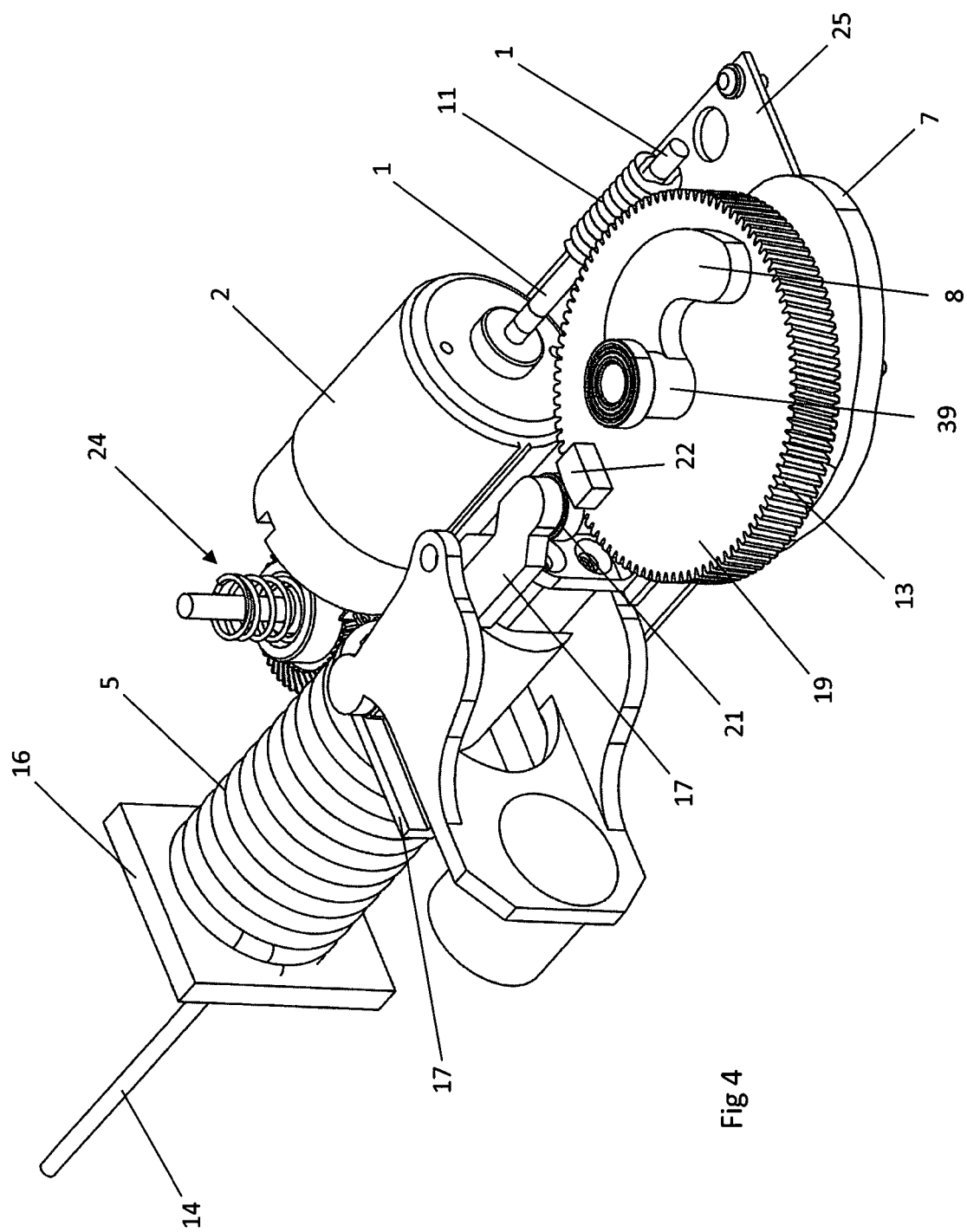
FIG. 4: the actuator according to FIG. 3 in a further perspective view from above.

In FIG. 4, the illustration of FIG. 3 is now shown again, wherein the housing component 28 is not shown here and the drive 2 with its drive shaft 1 is thus clearly visible.

Figure 5:
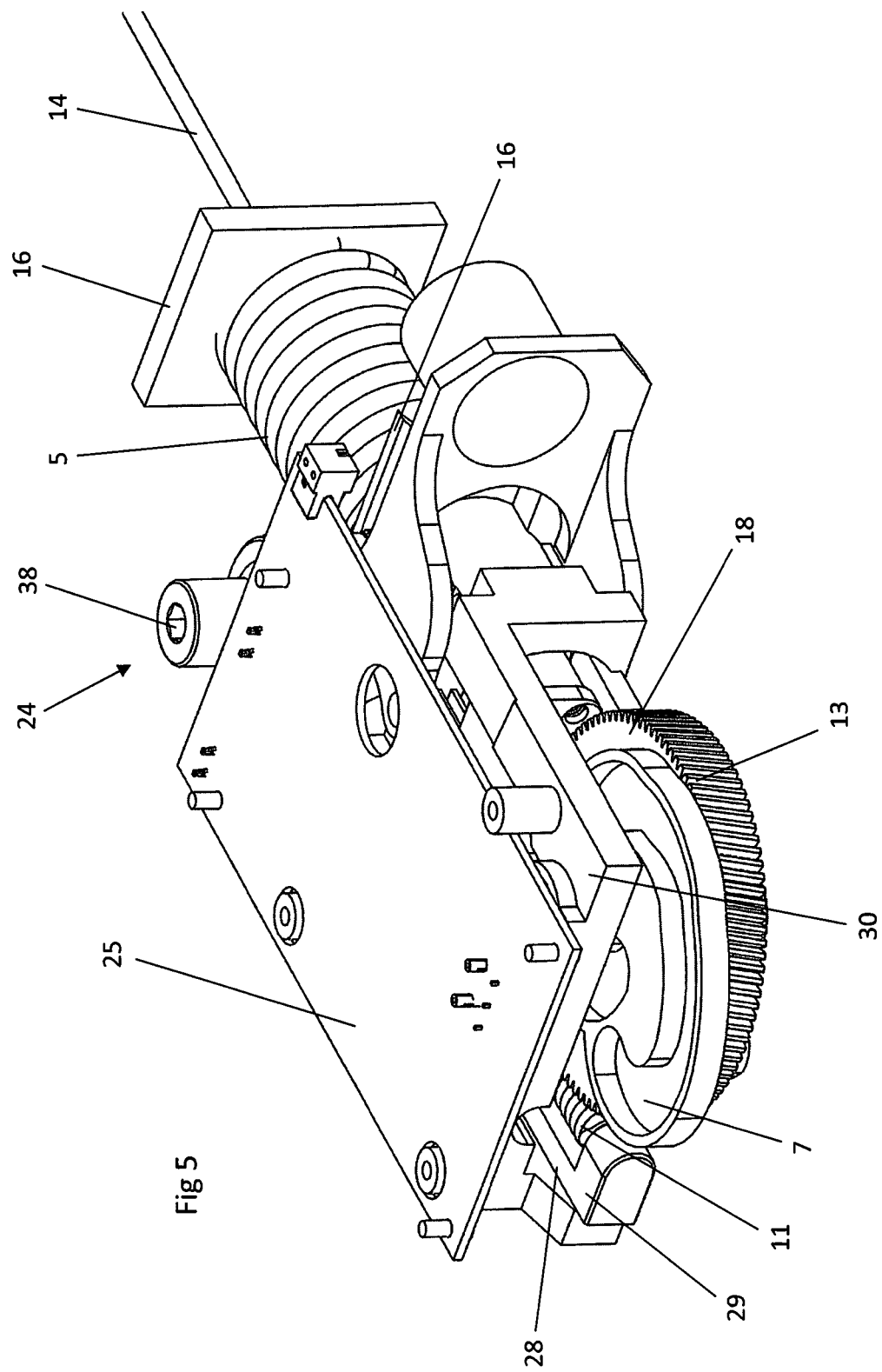
FIG. 5: the actuator according to FIGS. 3 and 4 in a perspective view from below.

FIG. 5 now shows the actuator according to FIGS. 3 and 4 in a perspective view from below. Here, the first control cam 7 can be seen, in particular, which is arranged on the surface 18 of the rotary element/gearwheel 13 opposite to the surface 19. Further, the screw 11 of the drive shaft 1 can also be seen, which meshes with the gearwheel 13. The drive shaft 1 is again held in a rotatable fashion in the end 29 of the housing component 28, wherein this housing component 28 is arranged on the housing plate 25.

Figure 6:
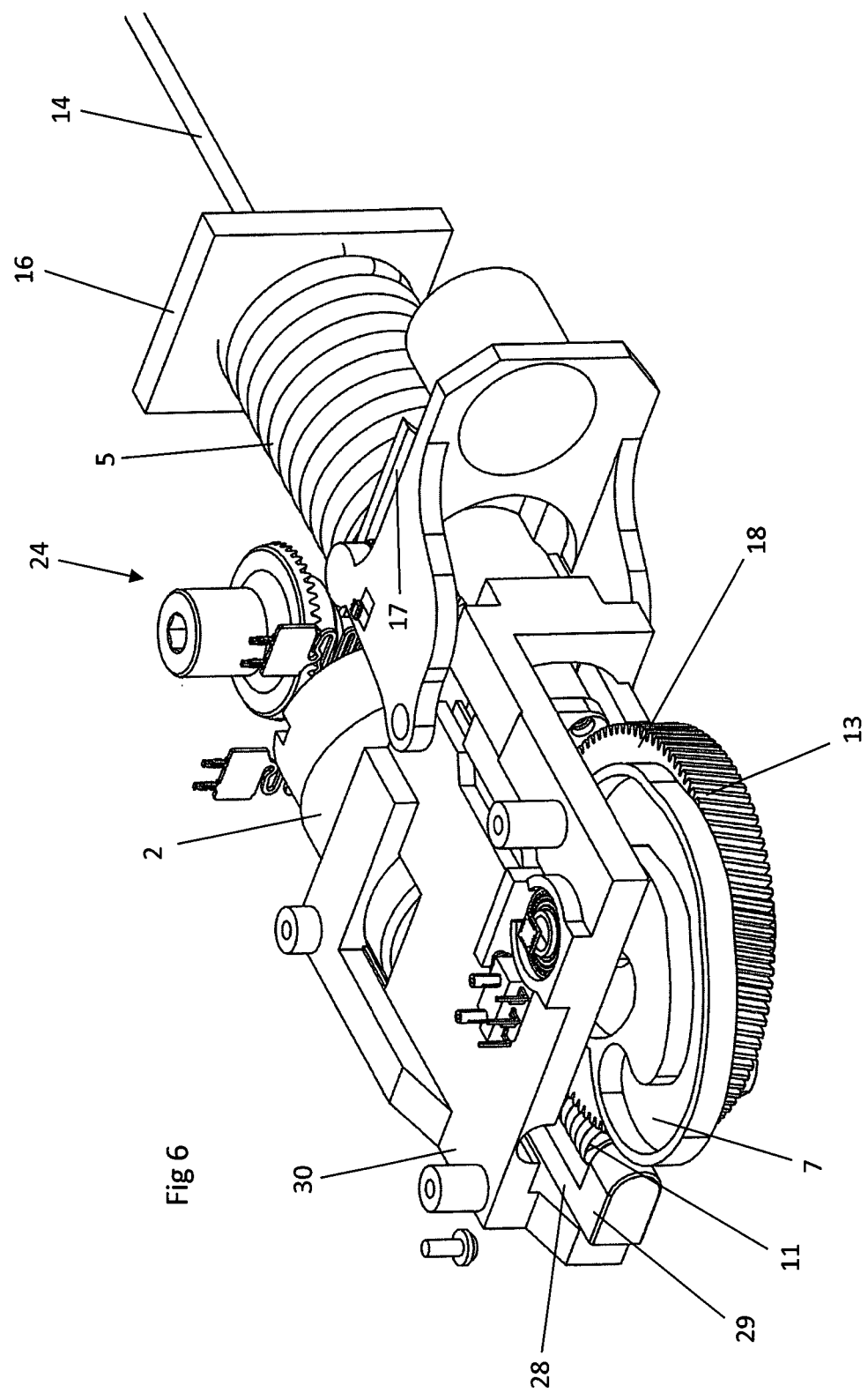
FIG. 6: the actuator according to FIG. 5 in a further perspective view from below.

FIG. 6 shows an view of FIG. 5 without the housing plate 25.

Figure 7:
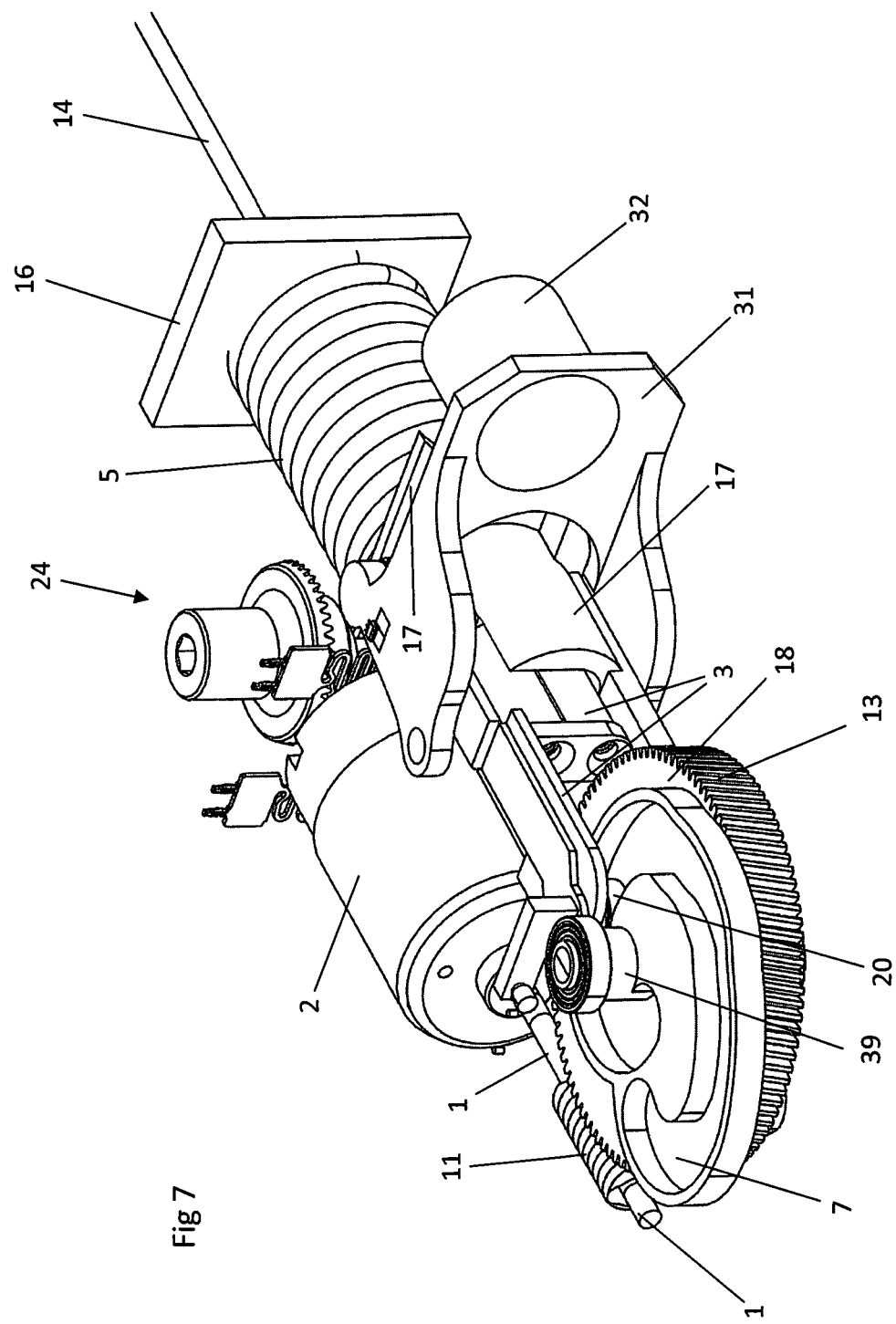
FIG. 7: the actuator according to FIG. 6 in a further perspective view from below.
Figure 8:
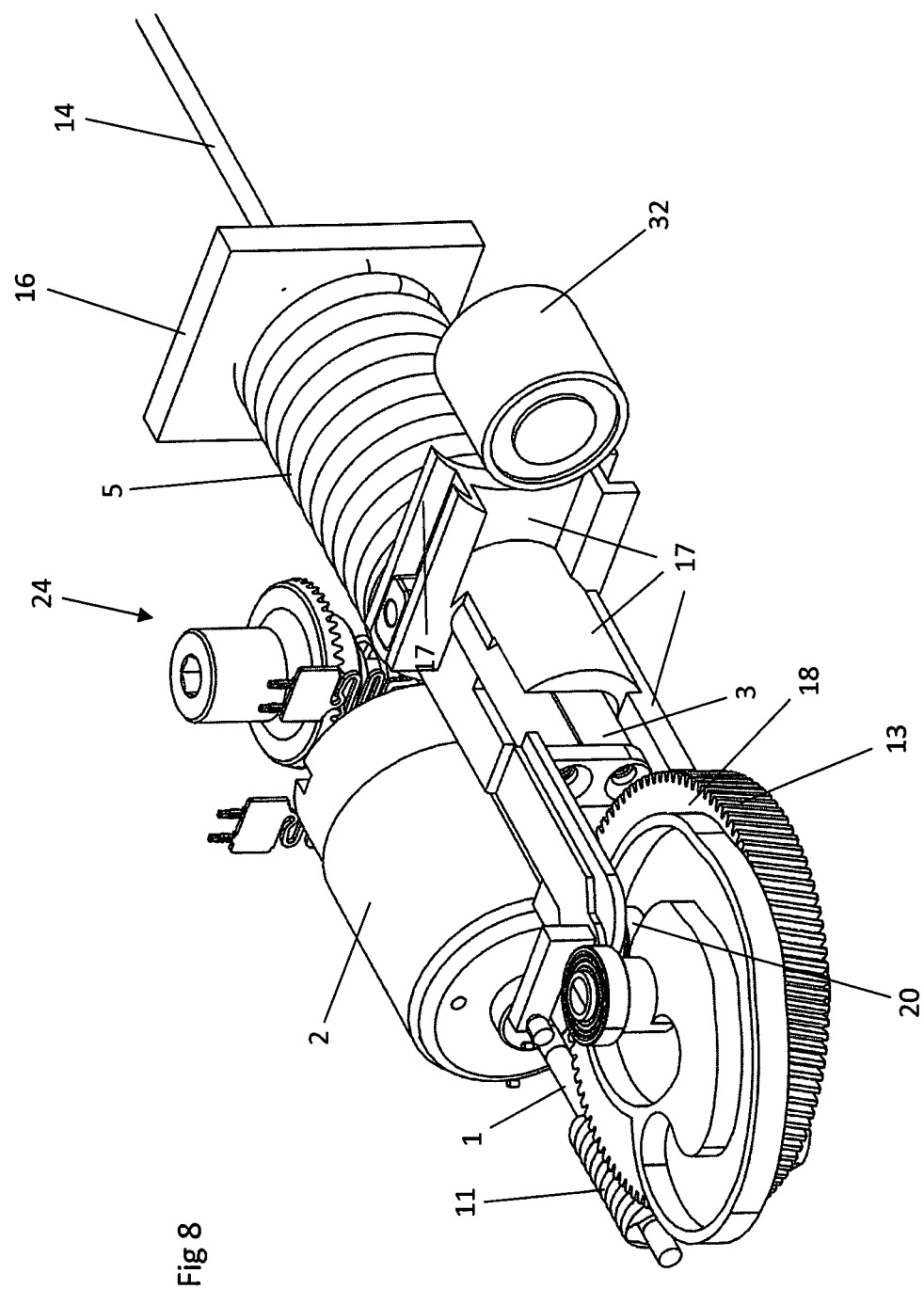
FIG. 8: the actuator according to FIG. 7 in a further perspective view from below.

FIG. 7 shows the actuator according to FIG. 6 without the housing component 30 shown in FIGS. 5 and 6. The first actuating element 3 is now also visible, which is connected to the cable 14 on the one hand for the actuation of a shifting device of an automatic gearbox and is equipped on the other hand with an engagement element 20 for operatively connected engagement in the control cam 7. It can also be clearly seen in this view that the first actuation element 3 is mounted slidably in the second actuation element 17, with which the spring element 5 is loaded. This arrangement is even more clearly visible in the view according to FIG. 8, in which a further housing component 31 has been foregone, in which the retention magnet device 32 is held.

Figure 9:
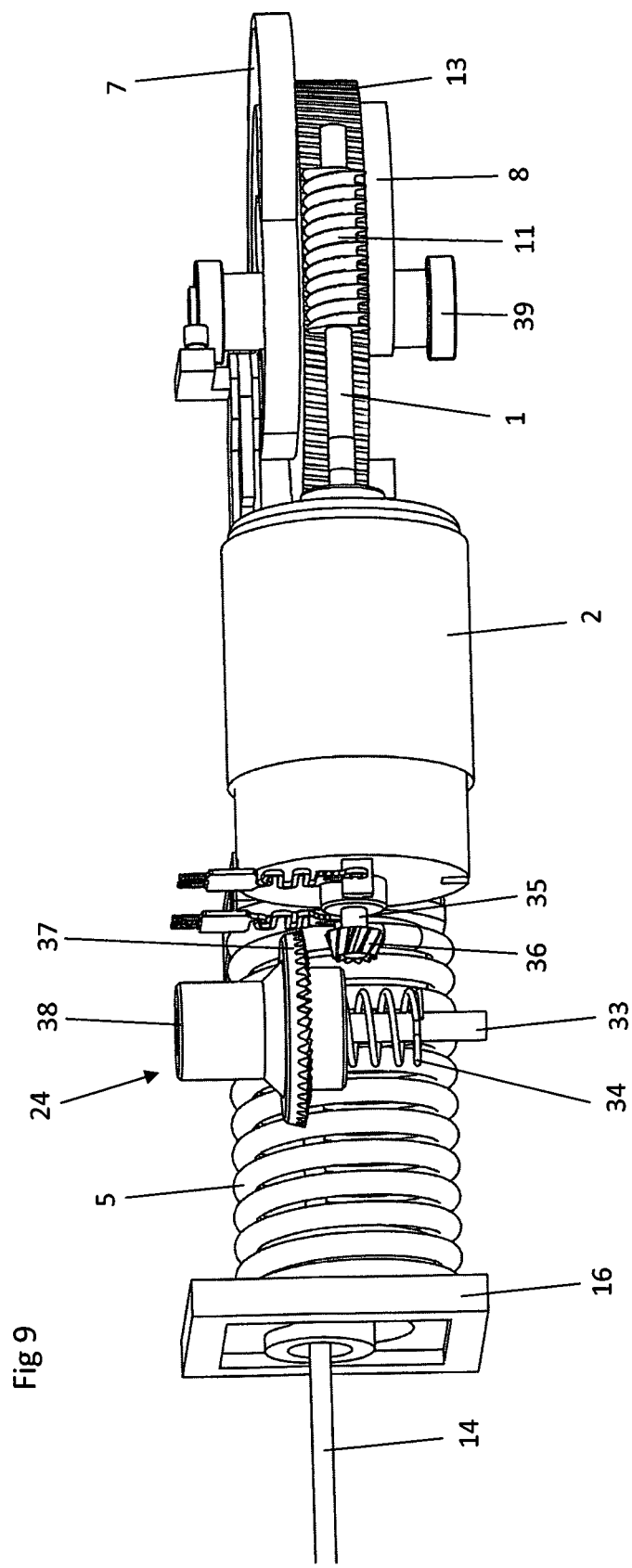
FIG. 9: the actuator from the previous figures in a lateral view.

In FIG. 9, a further lateral view of the actuator is shown, in which the emergency adjustment device 24, in particular, is seen in greater detail. The emergency adjustment device 24 consists of a pin 33, upon which a gearwheel 37 is arranged, which can be rotated via an opening 38 with a tool, in particular an Allen wrench. The gearwheel 37 can be loaded with spring pressure against a resetting force of a spring 34, such that the gearwheel 37 can be brought into operative connection with a wedge wheel 36 of a drive shaft 35 of the drive 2. Using this emergency adjustment device 24, it is possible to actuate the rotary element/gearwheel 13 with the assistance of a tool, in particular an Allen wrench, via the drive shaft 35 directly connected to the drive shaft 1 of the drive 2, such that the spring element 5 can be preloaded and the first actuation element 3 can be actuated. It is hereby possible, if the motor vehicle equipped with this actuator was turned with its automatic gearbox in the P-stage, to operate first actuation element 3, such that the P-stage of the automatic gearbox can be exited and the vehicle can be moved, even if there is no power available for the actuation of the drive 2. This will be necessary in cases of damage, in particular, in which the vehicle can no longer be operated, in particular if no power or no power source are available and the vehicle must be moved for towing.

Figure 10:
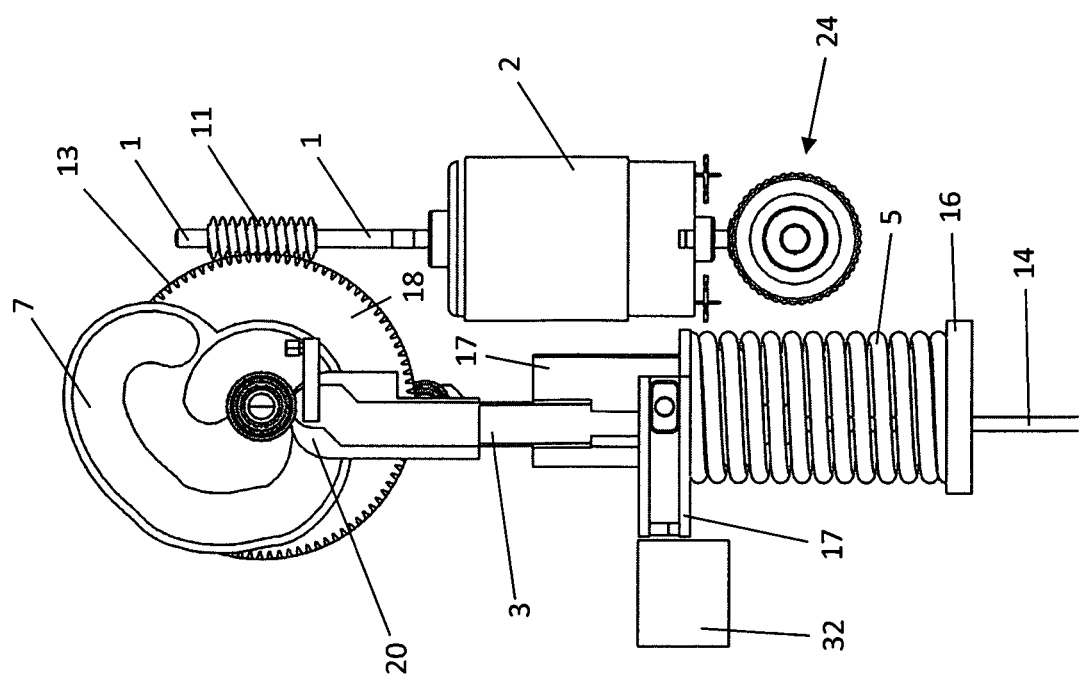
FIG. 10: the actuator from the previous figures in a view from below
Figure 11:
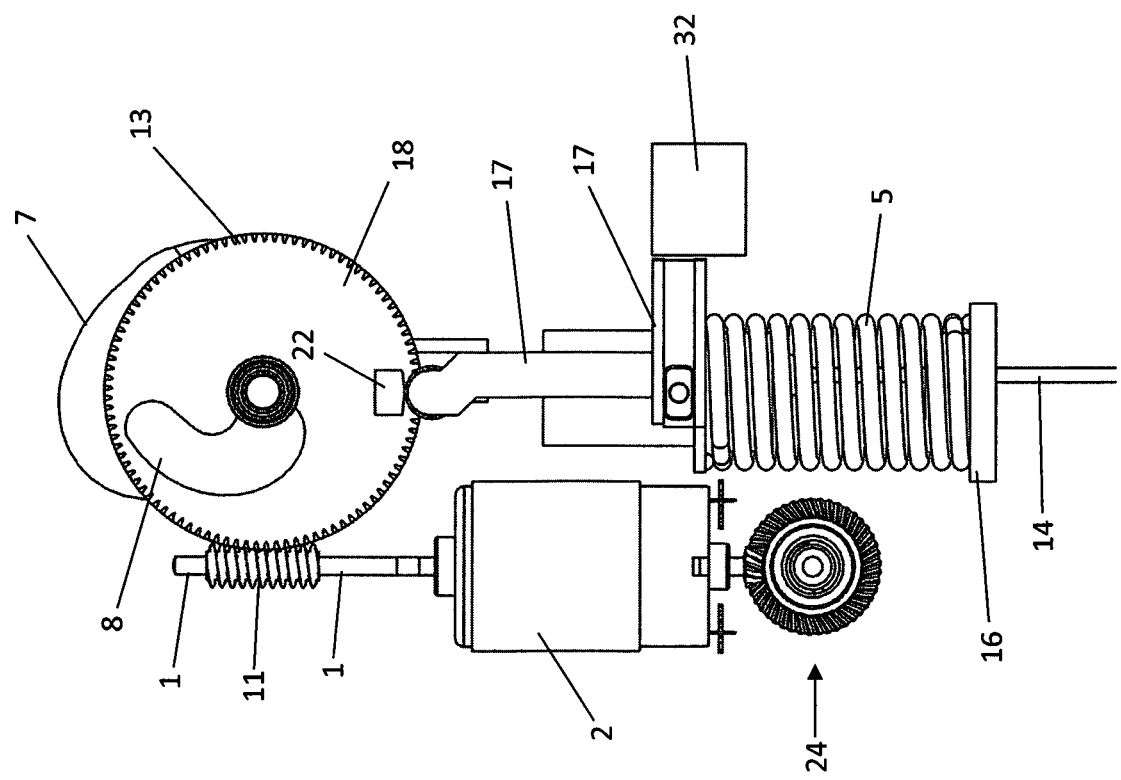
FIG. 11: the actuator from the previous figures in a view from above.

FIGS. 10 and 11 serve in particular to describe the functionality of the inventive actuator. The actuator in these illustrations is in a position that corresponds to the position of the P-stage of an automatic gearbox of a motor vehicle and the neutral angular position 0° of the rotary element/gearwheel 13. The engagement element 20 of the first actuating element 3 is operatively engaged with the first control cam 7, which is arranged on the surface 18 of the rotary element/gearwheel 13. If the rotary element designed as a gearwheel 13—in this illustration—is rotated or twisted counter-clockwise, i.e. in the direction of the maximum positive rotational position via the drive 2, the drive shaft 1, and the screw 11, then the actuating element 3 is moved into the control cam 7 in the direction of the housing component 16 due to the engagement of the engagement element 20, such that it is moved out of its P-stage via the shifting device of the automatic gearbox actuated by the cable 14, not shown further here, and various shifting stages can be set, for example R, N, D. The rotary element/gearwheel 13 is limited in its rotational movement due to the control cam 7, such that a rotation by approximately +180° or another value is possible. During the rotation of the rotary element/gearwheel 13, the preloading of the spring element 5 is maintained in its clamping position with the assistance of the retention magnet device 32. During the movement of the first actuating element 3 in the direction of the housing component 16, its pin 27 slides within the boring 26 in the direction of the base 40 of the boring 26.

If, during the operation of the motor vehicle, a damage occurs, as a result of which the actuator is load-free, then the retention magnet device 32 is no longer able to maintain the spring preloading of the spring element 5 due to the lack of power. Under the influence of the resetting force of the spring element 5, the second actuating element 17 moves in the direction of the rotary element/gearwheel 13, such that the pin 27 coming into contact with the base 40 of the boring 26 also transfers the resetting force of the spring element 5 to the first actuating element 3 and carries it along. Due to the resetting force of the spring element 5, the engagement element 20 of the first actuating element 3 is thus guided back along the control cam 7 and the rotary element moves from the maximum+180° angular position of the rotary element/gearwheel 13 to the original neutral angular position 0°—clockwise in this illustration—until the automatic gearbox has reclaimed its P-stage corresponding to the angular position of the rotary element/gearwheel 13. It is thus also ensured in the automatic gearbox that, in the case of damage, in particular if the motor vehicle or the actuator is load-free, the P-stage is automatically turned off under buildup of the resetting force of the spring element 5.

In the previously described embodiment, it is possible to drive the drive 2 in the direction opposite to the resetting movement, such that the rotary element/gearwheel 13 in FIG. 10 rotates counter-clockwise in the direction of the maximum positive rotational position. In this way, it can be brought about that the control cam 7 pushes the actuating element 3 via the engagement element 20 in the direction of the clamping position of the spring element 5, i.e. in the direction of the housing component 16. Through the engagement of the pin 27 on the base 40 of the boring 26 within the second actuating element 17, the resetting movement of the first actuating element 3 is transferred to the second actuating element 17, such that the second actuating element 17, with which the spring element 5 is engaged, resets the spring element 5 into the clamping position under buildup of the resetting force.

Based on the view in FIG. 10, it is naturally also possible to rotate or twist the rotary element/gearwheel 13 clockwise from its neutral 0° angular position into a maximum negative angular position up to −180°. However, there is no actuation of the first actuating element 3, because the control cam 7 is designed such that the engagement element 20 of the first actuating element 3 does not change its position. In the case of such a twisting, however, according to FIG. 11, the control cam 8 arranged on the other surface 19 of the rotary element/gearwheel 13 designed as a disk is engaged with the second engagement element 21 of the second actuating element 17 for the loading of the spring element 5.

After the spring element 5 has been loaded accordingly, the rotary element/gearwheel 13 is now rotated back to the neutral rotational position in the opposite direction, until the engagement element 21 of the actuating element 17 comes to lie on the projection 22, whereby the rotary element/gearwheel 13 reclaims its 0° angular position. During this rotation/twisting, the preloading of the spring element 5 is maintained by the retention magnet device 32. In this state, according to FIG. 11, the vehicle can now be properly turned off, whereby the actuator also naturally becomes load-free. Due to the projection 22, however, the preloading of the spring element 5 is also maintained without power.

The present invention is not restricted in terms of its configuration to the embodiments presented here. Rather, several variants are conceivable which make use of the solution presented here, even in the case of other types of configurations. It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

REFERENCE NUMERALS

1 Drive shaft
2 Drive
3 Actuating element
5 Spring element
7 Control cam
8 Control cam
9 Sliding element
10 Securing element
11 Screw
13 Gearwheel
14 Cable
15 Housing lid
16 Housing component
17 Actuating element
18 Surface
19 Surface
20 Engagement element
21 Engagement element
22 Projection
23 Damping element
24 Emergency device
25 Housing plate
26 Boring
27 Pin
28 Housing component
29 End
30 Housing component
31 Housing component
32 Retention magnet device
33 Pin
34 Spring
35 Output shaft
36 Wedge wheel
37 Gearwheel
38 Opening
39 Hub
40 Base
41 Boring

The invention claimed is:

1. An actuator, comprising:
a drive (2) configured for driving a drive shaft (1),
a first actuating element (3) operatively connected to the drive shaft (1) configured for actuating a shifting device,
a spring element (5) supported at one end on a housing component (16) of the actuator and at its opposite end on a second actuating element (17) configured to load the spring element (5),
a rotary element (4) defining an axis of rotation and adapted to be rotatably driven using the drive shaft (1),
a first control cam (7) rotatable about the axis of rotation and operatively connected to the first actuating element (3) and configured to actuate the shifting device, and
a second control cam (8) rotatable about the axis of rotation and configured to load the spring element (5).

2. The actuator according to claim 1, further comprising a first engagement element (20) of the first actuating element (3) configured to strike or engage in the first control cam (7), and a second engagement element (21) of the second actuating element (17) configured to strike or engage in the second control cam (8).

3. The actuator according to claim 2, wherein the rotary element (4) with the two control cams (7, 8) is configured to be rotated via the drive shaft (1) or the drive (2) between a maximum negative angular position up to −180° and a maximum positive angular position up to +180°, and wherein the spring element (5) is configured to be loaded through a rotation of the rotary element (4) from its neutral angular position at 0° up to the maximum negative angular position up to −180° via the second control cam (8) and the second engagement element (21) of the second actuating element (17).

4. The actuator according to claim 2, wherein with a rotation of the rotary element (4) from its neutral rotational position of 0° in the direction of its maximum positive rotational position up to 180°, using the first control cam (7) and the first engagement element (20), various shifting stages of the shifting device can be set.

5. The actuator according to claim 1, wherein the first control cam (7) is configured so that with a rotation of the rotary element (4) from its neutral rotational position of 0° in the direction of its maximum negative rotational position up to −180°, the position of the first actuating element (3) remains unchanged upon actuation of the shifting device.

6. The actuator according to claim 1, wherein the rotary element (4) is a disk (6) defining opposing surfaces (18, 19) and the two control cams (7, 8) are arranged on the opposing surfaces (18, 19), respectively.

7. The actuator according to claim 1 wherein the first control cam (7) is configured so that upon rotating the rotary element (4) between its neutral angular position 0° and its maximum positive angular position up to +180°, the spring element (5) is loaded under buildup of a resetting force.

8. The actuator according to claim 1, further comprising a projection (22) on the surface (19) of the rotary element (4) adapted to receive the second engagement element (21).

9. The actuator according to claim 1, further comprising a screw (11) on the drive shaft (1), through which the rotary element (4) is driven via at least one gearwheel (13).

10. The actuator according to claim 1, further comprising an electric retention magnet device (32) configured to hold the spring element (5) loaded under buildup of a resetting force in its position.

11. The actuator according to claim 1, further comprising a damping element (23) configured to damp movement of the rotary element (4) and/or the first actuating element (3) if the rotary element (4) is rotated under the influence of the resetting force of the spring element (5).

12. A device for setting of a parking lock of a motor vehicle automatic gearbox with an actuator according to claim 1.

13. The device according to claim 12, further comprising a mechanical, electromechanical, electric, electronic, hydraulic, or pneumatic emergency adjustment device (24) to drive the actuating element (3) or load the spring element (5).

14. A motor vehicle with an automatic gearbox and the device of claim 13 interacting therewith.

15. A motor vehicle with an automatic gearbox and the device of claim 12 interacting therewith.

\* \* \* \* \*